United States Patent [19]
Shaw

[11] Patent Number: 5,218,468
[45] Date of Patent: Jun. 8, 1993

[54] ELECTRO-OPTIC DEVICE

[75] Inventor: Robert N. Shaw, Ipswich, England

[73] Assignee: British Telecommunications public limited company, London, England

[21] Appl. No.: 931,503

[22] PCT Filed: May 18, 1989

[86] PCT No.: PCT/GB89/00539
§ 371 Date: Oct. 30, 1990
§ 102(e) Date: Oct. 30, 1990

[87] PCT Pub. No.: WO89/11675
PCT Pub. Date: Nov. 30, 1989

Related U.S. Application Data

[63] Continuation of Ser. No. 601,704, Oct. 30, 1990, abandoned.

[30] Foreign Application Priority Data

May 18, 1988 [GB] United Kingdom ............... 8811689

[51] Int. Cl.$^5$ .......................... G02F 1/03; G02F 1/01; G02F 1/035
[52] U.S. Cl. .................................. 359/245; 359/254; 359/276; 385/2
[58] Field of Search ...................... 350/355, 356, 96.14, 350/96.13, 332; 359/245, 276, 254; 385/2, 14

[56] References Cited

U.S. PATENT DOCUMENTS 4,253,734  3/1981  Komurasaki et al. ............... 350/356

FOREIGN PATENT DOCUMENTS 0092180  10/1983  European Pat. Off. .
0092181  10/1983  European Pat. Off. .
0099122  5/1986  Japan ................................. 350/96.14

OTHER PUBLICATIONS

Patent Abstracts of Japan, vol. 7, No. 32, (P-174)(1177), Feb. 8, 1983; & JP A, 57185418 (Nippon Denki K.K.) Nov. 15, 1982.
Patent Abstracts of Japan, vol. 7, No. 180, (P-215)(1325), Aug. 9, 1983; & JP,A. 5882223 (Matsushita Denki Snagyo K.K.) May 17, 1983.
Applied Physics Letters, vol. 35, No. 1, Jul. 1, 1979, "Efficient LiNbO3 balanced bridge modular/switch with an ion-etched slot", Minakata, pp. 40-42.

Primary Examiner—Bruce Y. Arnold
Assistant Examiner—Evelyn A. Lester
Attorney, Agent, or Firm—Nixon & Vanderhye

[57] ABSTRACT

A method of minimizing voltage induced drift in electro-optic devices, the optical state of which is controllable by the application of an electrical potential between first and second electrodes of the device, the method comprising controlling the electrical potentials applied to the first and second electrodes such that in use the average potential difference between the first and second electrodes is substantially zero.

13 Claims, 6 Drawing Sheets

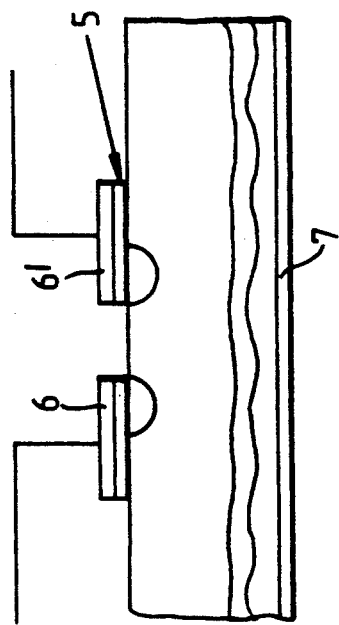
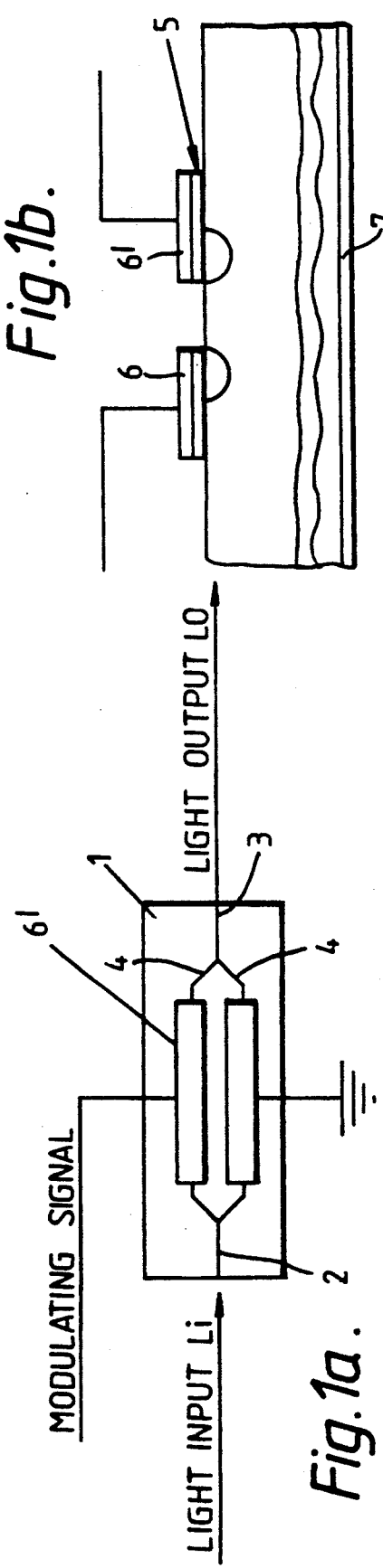
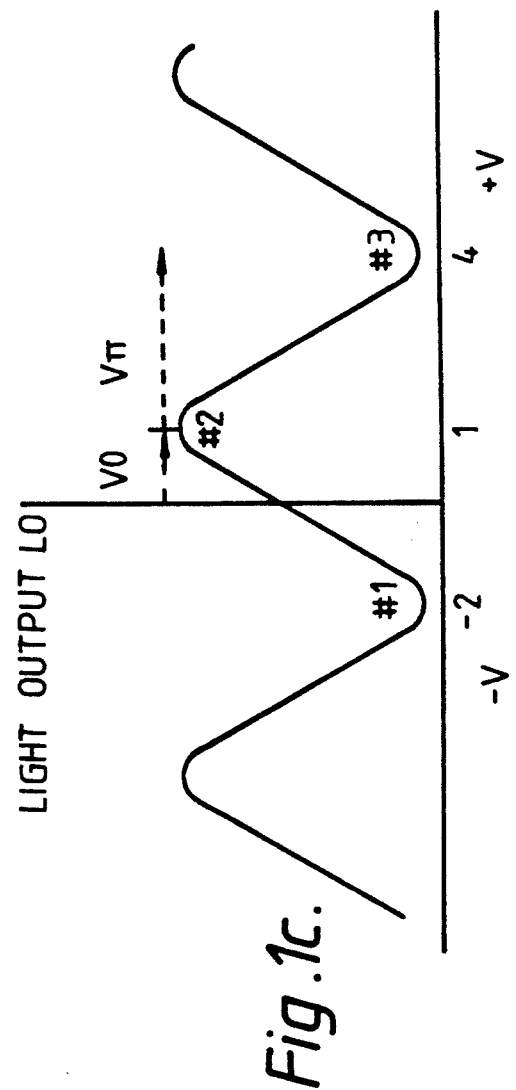
Fig.1a.
Fig.1b.
Fig.1c.

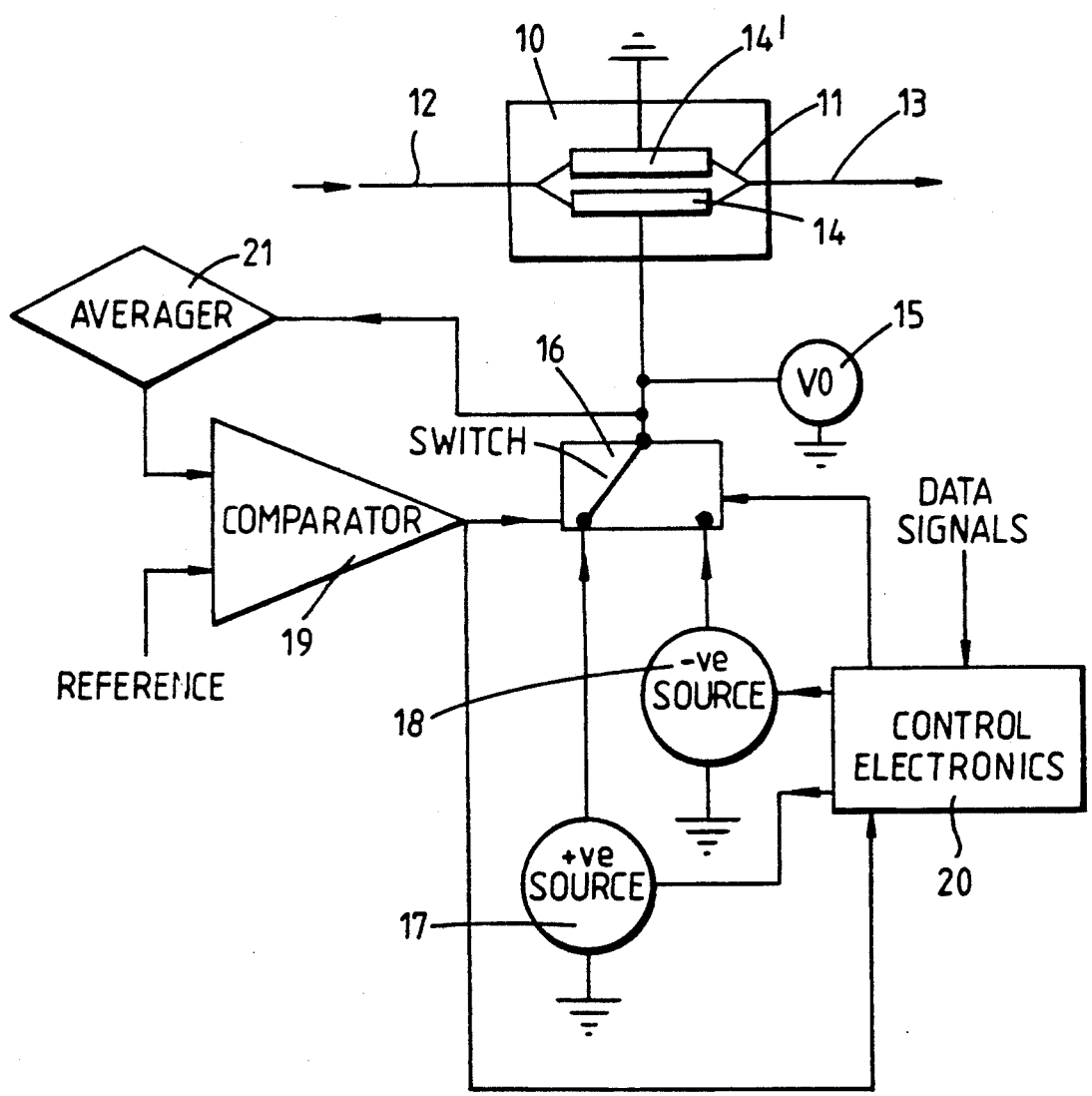

ELECTRO-OPTIC DEVICE

This is a continuation of application Ser. No. 07/601,704, filed Oct. 30, 1990, now abandoned.

FIELD OF THE INVENTION

The present invention relates to electro-optic devices and in particular but not exclusively to lithium niobate electro-optic waveguide devices.

BACKGROUND OF THE INVENTION

With lithium niobate (LNB) devices such as directional couplers and Mach Zehnder (MZ) interferometers, there exists the problem that in order to achieve a given level of extinction, switching or modulation, continually greater electrode potentials are required throughout the operating life of the device. This phenomenon is known as voltage induced drift. Ultimately a limit is reached where the driving electronics are supplying their maximum potential and it is no longer possible to achieve the desired performance. Alternatively the device may fail catastrophically with electrode breakdown caused by the high applied potential. Moreover, there is a further disadvantage of using high electrode potentials with directional couplers, in that the extinction ratio is impaired relative to that attainable with lower electrode potentials.

Clearly devices subject to such drift are unsuitable for any long term systems applications such as telecommunications or optical signal processing, because there is no long term certainty that any particular device output corresponds to a certain applied potential.

One method which has been suggested as a means of overcoming the problem of voltage induced drift in electro-optic devices for long term systems use is to divert part of the device's optical output to a detector in order to monitor the drift so that the bias voltage can be varied to trace it. The disadvantages of this hypothetical arrangement are twofold: first, the difficulty of monitoring part of the optical output and deriving the required bias level: second, the drift tends to continue at a near linear rate, consequently higher and higher bias levels are still required.

SUMMARY OF THE INVENTION

The present invention seeks to provide a means of controlling voltage induced drift.

According to a first aspect, the present invention provides a method of minimizing voltage induced drift in electro-optic devices the optical state of which is controllable by the application of an electrical potential between first and second electrodes of the device, the method comprising controlling the electrical potentials applied to the first and second electrodes such that in use the average potential difference between the first and second electrodes is substantially zero.

According to a second aspect, the present invention provides a method of controlling an electro-optic device the optical state of which is controllable by the application of an electrical potential between first and second electrodes of the device, the method comprising the steps of applying a first electrical potential to the first electrode, and applying a second potential to the second electrode, characterised in that one or both of the first and second electrical potentials is/are adjusted so that, in use, the average potential difference between the first and second electrodes tends to zero.

According to a third aspect, the present invention provides a driving arrangement for electro-optic devices, arrangement comprises electrode driving means to supply both positive and negative drive voltages, averaging means to generate an average signal indicative of the average electrode voltage, and control means for controlling said electrode driving means in response to said average signal, which control means causes said electrode driving means to supply positive or negative drive voltages as necessary to maintain, in use, a substantially zero average electrode voltage.

According to a fourth aspect, the present invention provides a driving arrangement for electro-optic devices, arrangement comprises a data input to receive an input data stream of known disparity, and control means responsive to the input data stream for controlling said electrode driving means to supply positive or negative drive voltages as necessary to maintain, in use, a substantially zero average electrode voltage.

BRIEF DESCRIPTION OF THE DRAWINGS

Preferred embodiments will not be described by way of example only with reference to the accompanying drawings, in which:

FIG. 1(a) shows a schematic plan view of a conventional Mach-Zehnder interferometer:

FIG. 1(b) shows schematically a cross section, on the line A—A, through the interferometer of FIG. 1(a);

FIG. 1(c) shows the transfer characteristic of a device such as that shown in FIG. 1(a);

FIG. 2 shows schematically an arrangement for driving an electro-optic device, such as the interferometer of FIG. 1(a), according to the method of the present invention;

DETAILED DESCRIPTION OF THE DRAWINGS

Figure 3:
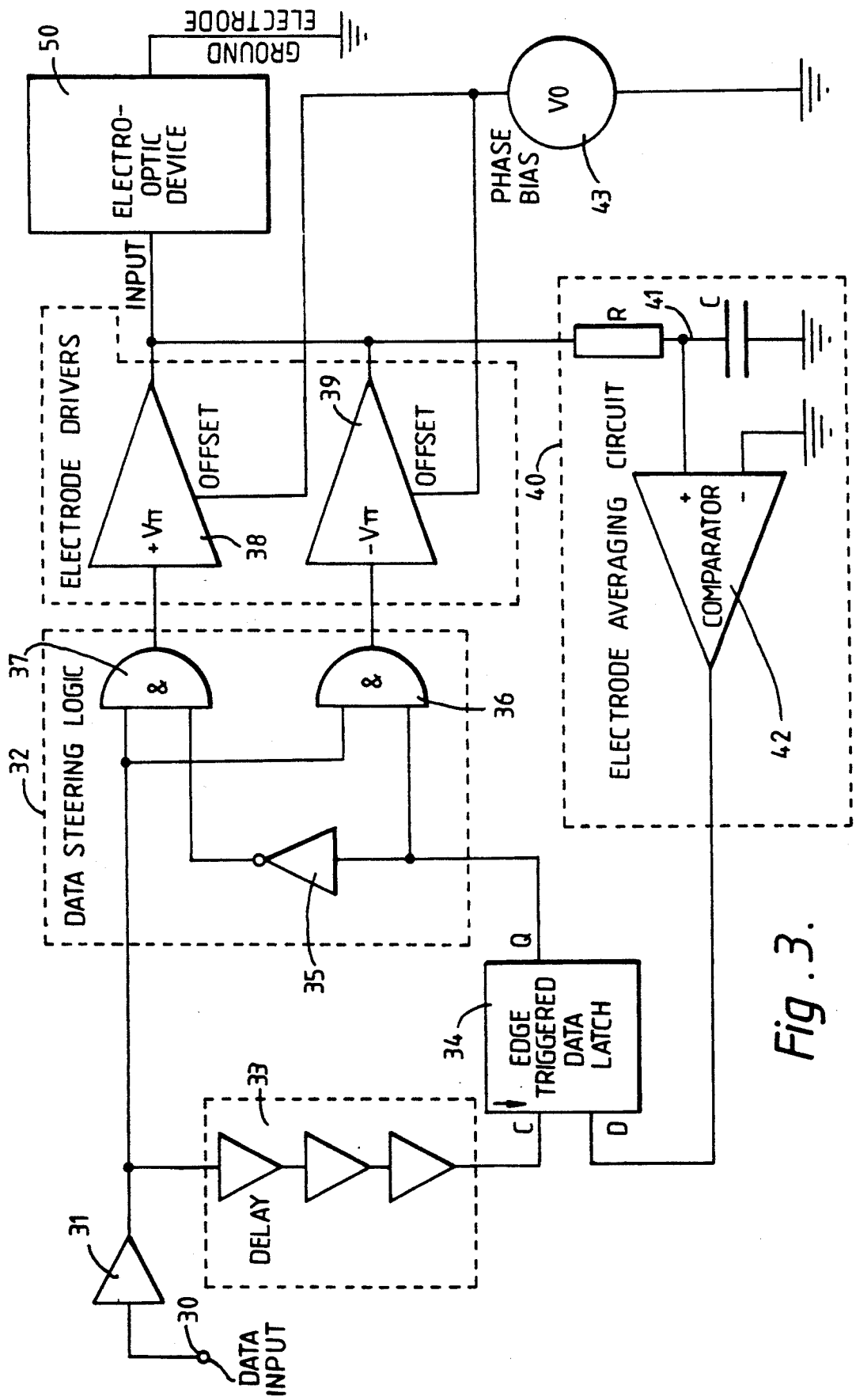
FIG. 3 shows schematically an electro-optic device driving arrangement according to the present invention, for use with electrode drivers capable of providing a DC offset.

To facilitate an understanding of the invention the operation of a typical electro-optic device, in this case an MZ interferometer, will first be described. An MZ interferometer is formed on a z-cut lithium niobate substrate 1, typically 40 mm long, 10 mm wide and 1 mm thick, and comprises an waveguide 2 and an output waveguide 3 coupled by a pair of waveguide portions 4, 4' which form the arms of the interferometer. The arms are about 10 μm apart. The waveguides are about 5 μm wide and are formed in the substrate by the selective diffusion of titanium. An optical input to the input waveguide 2 will generally be provided by means of an optical fibre 10 aligned therewith. Similarly, an optical fibre 11 will generally aligned with the output waveguide 3 to receive the optical output. On the surface of the substrate, over the arms 4, 4', there is, optionally, formed a buffer layer 5 comprising a dielectric such as silica or alumina. In the absence of a buffer layer, voltage induced drift is less of a problem, but, unfortunately, optical attenuation is very high. Consequently, a buffer layer is invariably used, despite the problems of voltage induced drift. Electrodes 6, 6' of aluminum or gold are formed of the buffer layer 5 and are aligned with the arms 4, 4'. The underside of the substrate is metallised 7. One electrode 6 and the metallisation 7 are connected to ground. The other electrode 6' is supplied with a modulating signal. The potential of the electrode 6' establishes an electrical field between the two electrodes, some of which passes through the waveguides. The vertical component of this electric field passing through the interferometer arms causes a change in their refractive index, increasing the index in one and decreasing it in the other.

As a result of the difference in refractive indices there is a phase difference between the outputs of the two arms, producing constrictive or destructive interference when the outputs are combined. The resulting transfer characteristic, showing the light output against electrode voltage for a constant light input, is presented in FIG. 1(c).

The transfer characteristic of an MZ interferometer is essentially a periodic cos squared function, the peaks of which correspond to points of constrictive interference, the troughs to destructive interference. The electrode voltage—that is the potential difference between the two electrodes, required to drive the output from a peak to a trough is called the switching voltage $v_\pi$. The voltage required to obtain the output peak nearest to zero volts is the phase bias voltage $V_O$. A typical switching voltage for 20 mm long electrodes, on z-cut LNB, is about 3.5 v. The phase bias voltage can be any value up to the switching voltage.

As should by now be clear, voltage induced drift involves the phase bias voltage changing during the life of the device.

In accordance with the present invention we minimise voltage induced drift by driving devices subject to such drift in such a may that the average electrode voltage tends to zero. A zero or near zero average electrode voltage is achieved by using both positive and negative drive pulses. In outline a suitable driving arrangement would comprise: two electrode drivers, one for each polarity: and an averaging circuit to monitor the electrode voltage; a comparator having some hysteresis, connected to the averaging circuit and used to monitor the electrode voltage; the output of the comparator being used to select the appropriate one of the drivers so as to minimise the average electrode voltage.

A suitable device driving arrangement is shown schematically in FIG. 2. An MZ interferometer 10 comprises a z-cut LNB substrate with waveguide regions 11 formed therein. Optical input signals are supplied by an optical fibre 12 aligned with one end of the waveguide 11. A second optical fibre 13 is aligned with the opposite end of the waveguide to receive optical output signals. Associated with each interferometer arm is an electrode 14 and 14'. The optical output of the device is controlled by the potential applied across the two electrodes. In practice the phase bias voltage $V_o$ is applied to one or other of the electrodes so that when the switching voltage $V_\pi$ is applied the device operates between a peak and a trough in the electro-optic transfer characteristic. Thus the electrode voltage has an Ac component corresponding to the switching voltage $V_\pi$ and a DC component corresponding to the phase bias voltage $V_o$. The phase bias voltage must be taken into account in determining the average electrode voltage and this may be more easily done if Vo is applied to one electrode, $V_\pi$ being applied as appropriate to the other. The alternative, shown in FIG. 2, is to ground one electrode, and apply Vo and $V_\pi$, as appropriate, to the other electrode. The phase bias voltage source 15 is connected between electrode 14 and ground. Also connected to electrode 14 are switching means 16 switchable to connect it to either positive source 17 or negative source 18. Controlling the switching means 16 directly or indirectly is a comparator 19. The comparator will normally be associated with, or part of, the control electronics 20, to ensure that the switching means changes states either during a break in transmission or synchronously with a transition in the incoming data. Averaging means 21 generate a value corresponding to the long term average electrode voltage, value is monitored continuously or periodically by the comparator. If the comparator monitors the average values only periodically, the un-monitored periods should not be so long that significant voltage induced drift occurs. As very many variables (including: electrode voltage, humidity, temperature, material, crystal orientation, defect density, device design, etc) influence the rate of drift, it is not practical to attempt to specify a universally acceptable upper limit for the length of the un-monitored periods. Clearly where there is likely to be rapid drift, e.g. 1 volt per hour, it would be desirable to monitor the average at least once a minute. Where there is likely to be a low drift rate, e.g. 1 mV per hour or less, the average may be monitored as infrequently as once an hour or even less. However, there appears to be no particular advantage to having long intervals between assessment of the average, while there are clear disadvantages. Preferably, therefore the average is monitored several tines a minute. More preferably the average is monitored at least once every hundred milliseconds.

In FIG. 3 an alternative arrangement is shown in slightly greater detail. This embodiment is designed to cater for electrode drivers which wave the facility for offsetting their outputs to an externally defined level. The data input 30 feeds via an amplifier 31 into data steering logic 32 and delay means 33. The delay means 33 feeds into the c input of an edge-triggered data latch (a D-type flip-flop) 34. The Q output of data latch 34 feeds an input of each of first and second AND gates 36 and 37 of the data steering logic 32, one, 36, directly, the other via an inverter 35. The second and final input of each of the two AND gate 36 and 37 serves as the data steering logic connection of the output of amplifier 31. The outputs of the AND gates, 36 and 37 trigger respective ones of a pair of electrode drivers 38 and 39. The first electrode driver, 38 is driven by AND gate 37 and provides positive-going switching voltages to one electrode of the electro-optic device 50, the other electrode of the device 50 being grounded. The second electrode driver, 39, similarly provides negative-going switching voltages. The outputs of the electrode drivers are also connected to an electrode averaging circuit 40 which provides feedback to the D input of the data latch 34. The delay element 33 and the data latch 34 are provided to ensure that switching between electrode drivers occurs during a logic-low state in the data bit pattern to give synchronized transparent operation. The electrode averaging circuit comprises an RC circuit 41 and a comparator 42, the RC circuit being connected between the outputs of the electrode drivers and the summing input of the comparator 42, the second, reference input of which is grounded. The RC circuit 41 provides some hysteresis in order to prevent too frequent switching between the electrode drivers. The phase bias voltage Vo is provided by the DC offset output of the electrode drivers and should be chosen to be less than $V_\pi/2$.

For a device with a transfer characteristic as shown in FIG. 1c, the logic '0' state would be aligned to node $\neq 2$ by offsetting the outputs of the two electrode drivers by +1 V. Thus the ground electrode would be at zero volts and a logic "1" would appear as either +4 V the positive driver is selected or −2 V when the negative driver is selected. The comparator input is then the actual average electrode voltage and includes the phase bias offset.

Figure 4:
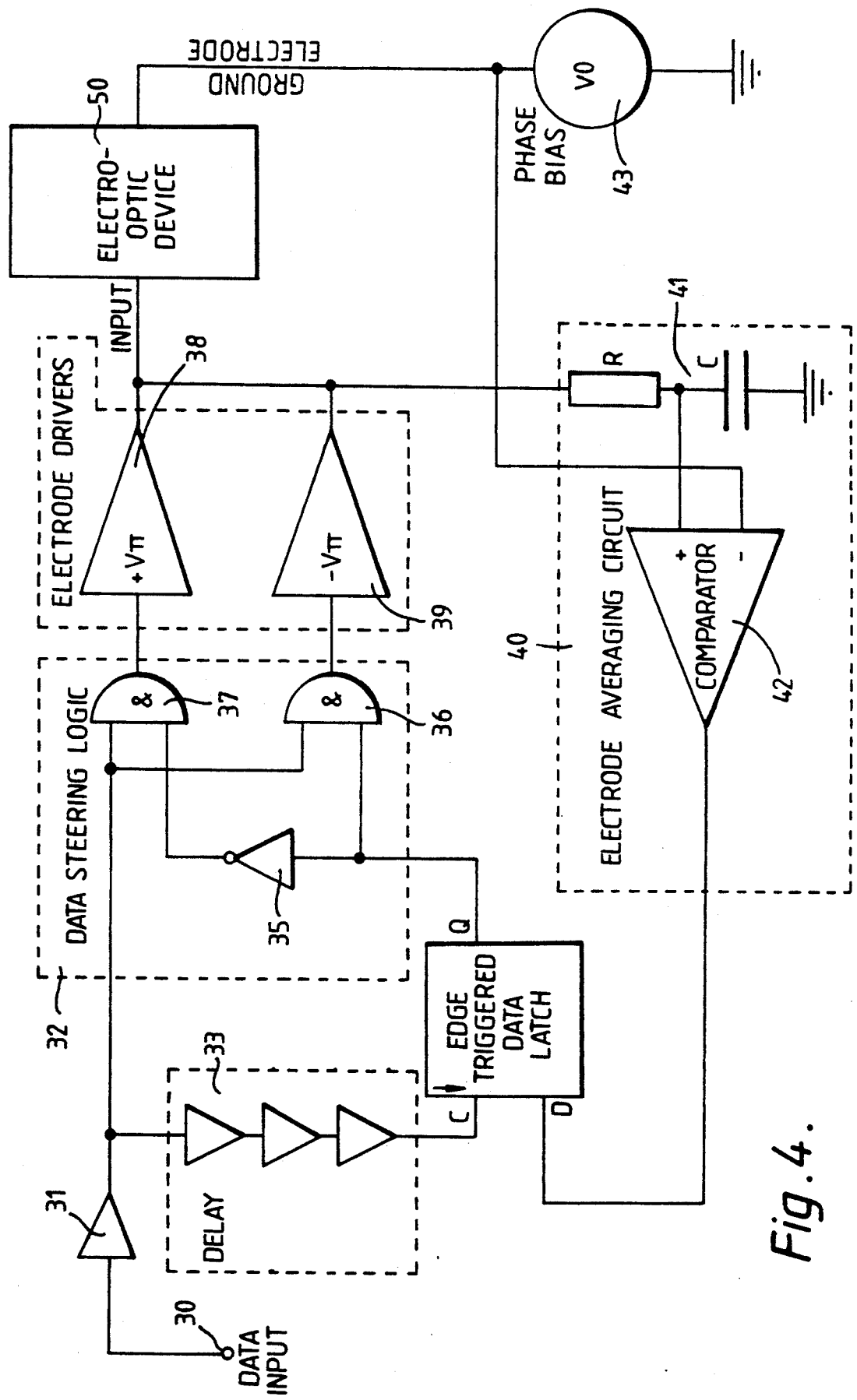
FIG. 4 shows schematically an arrangement similar to that shown in FIG. 3, but suitable for use with electrode drivers which are incapable of providing a DC offset.

FIG. 4 illustrates a further embodiment which uses electrode drivers which do not wave a DC offset capability. The arrangement differs from that shown in FIG. 3 only in that the phase bias voltage is applied to the ground electrode, but with opposite polarity to give the same electrode difference voltage as in the previous embodiment. Additionally the reference contact of the comparator 42 in the electrode averaging circuit is connected to the ground electrode, and hence −Vo, rather than to ground. Again the magnitude of the phase bias voltage should be chosen to be less than $V_\pi/2$. With reference to FIG. 1c, logic '0' will now be OV and logic "1" would appear as either +3 V when the positive driver is selected or −3 V when the negative driver is selected. By connecting the reference input (−) of the comparator to the negative phase bias voltage, the comparator now operates with the same difference voltage as the electrodes.

Figure 5:
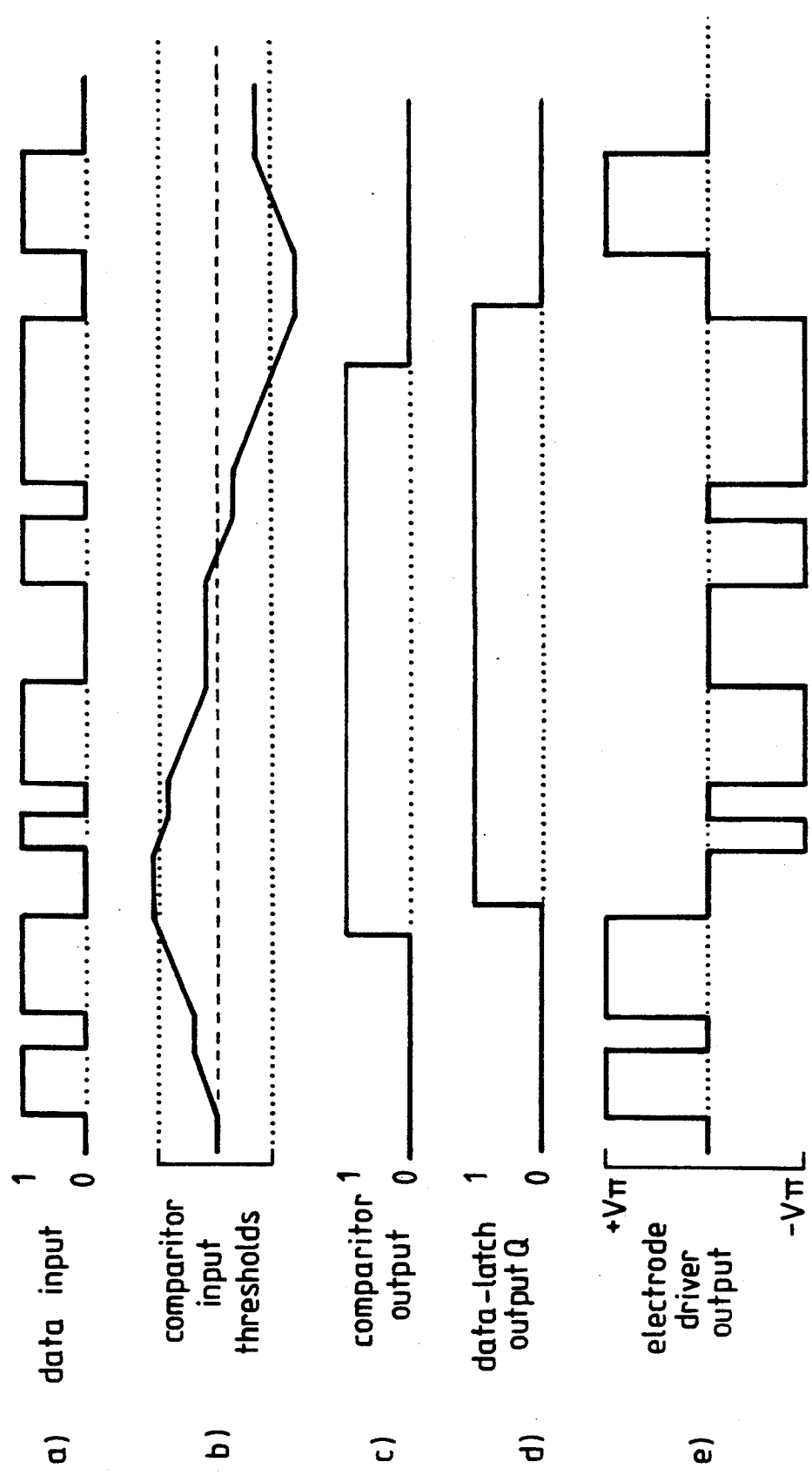
FIG. 5 is a schematic logic state diagram for the arrangements shown in FIGS. 3 and 4.

FIG. 5 shows an illustrative logic state diagram for the embodiments shown in FIGS. 3 and 4. This Figure is largely self explanatory, but it is worth noting the action of the comparator. Initially, "1"s in the input data cause the positive electrode driver, 38, to operate, with "0"s requiring a zero output from the electrode drivers. Hence a "1" initially causes the voltage on the switch input of the comparator to rise. When the comparator's threshold is exceeded, its output changes level, in this case going from low to high. At the next transition in the input data, the data-latch output changes state, in this case also from low to high. Consequently the next "1" in the input data results in a pulse from the negative electrode driver 39. The negative electrode driver is used for all data "1"s until the comparator's opposite threshold is reached, which results in the comparator's output changing state. On the next input data transition the data-latch output Q changes state, with the consequence that subsequent "1"s in the input data stream result in the positive electrode driver 38 supplying the switching voltage $V_\pi$. Clearly the comparator's threshold levels should be set such that voltage induced drift is kept to an acceptably low level.

Figure 6:
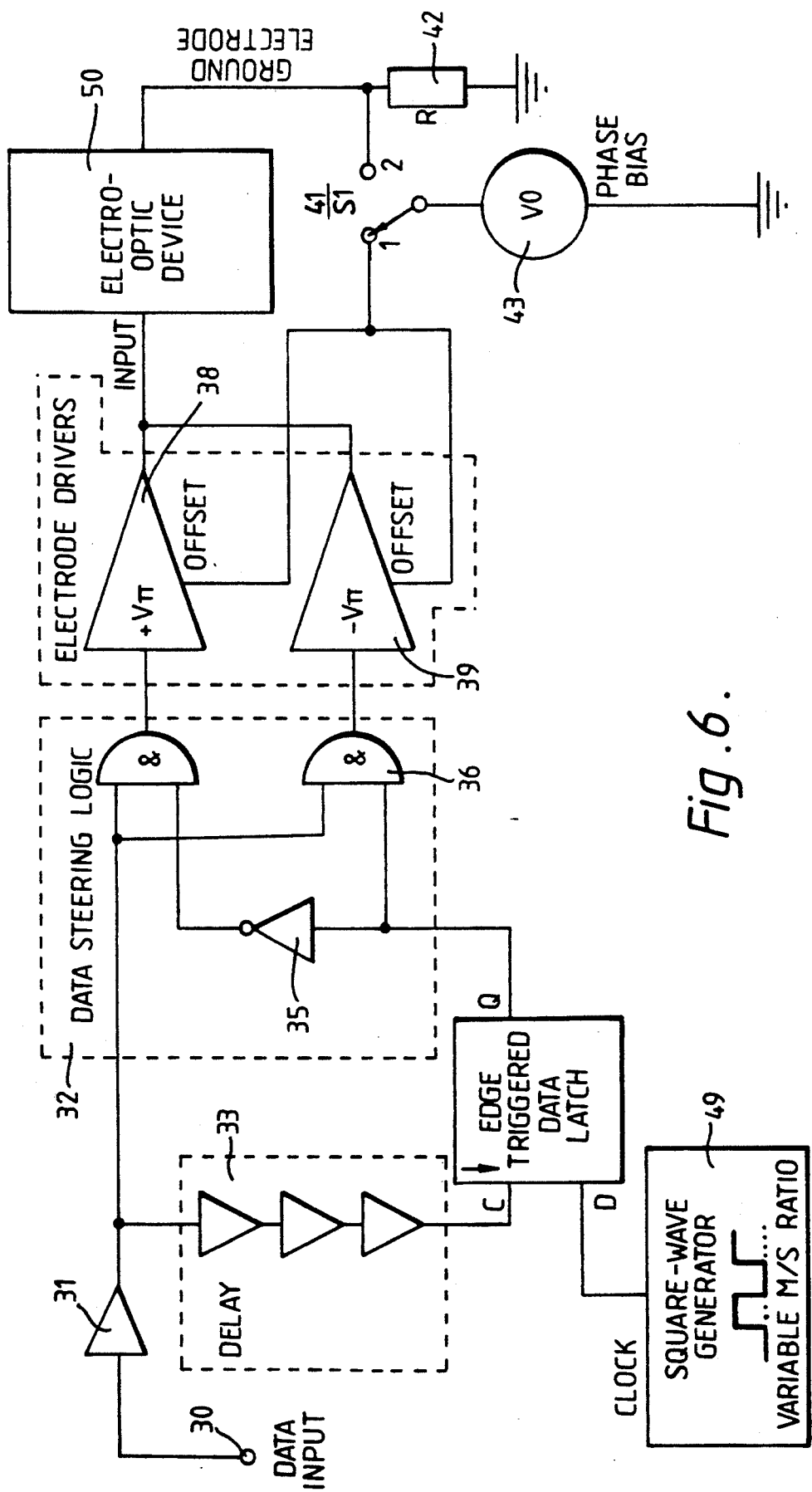
FIG. 6 shows schematically an electro-optic device driving arrangement for use with systems in which there is constant data disparity.

FIG. 6 shows a yet further embodiment, devised for systems in which there is constant data disparity in the code of the input data. The majority of constant disparity data codes do in fact have an average mark-to-space ratio of 50/50 because of the way high-speed receiver designs work, and for such data codes a very simple driving arrangement is possible. The primary difference between this embodiment and those illustrated in FIGS. 3 and 4 is that the switching between electrode drivers is not controlled by means of an electrode averaging circuit 40 connected to the D input of the edge triggered data latch but rather a clock generator, in this case a square-wave generator is connected in place of the averaging circuit 40. The effective mark-to-space ratio of the clock generator is set to give zero average electrode difference voltage for the code disparity and phase bias voltage used. Since the phase bias voltage required varies from device to device, it is preferable to employ a clock generator having a variable mark-to-space ratio so that the ratio can be set according to the phase voltage used for any particular device.

With a constant disparity data code having a mark-to-space ratio of 50/50, the condition for zero average electrode voltage is given by:

$$0 = 0.5\ Vo + m\ (Vo + V\pi) + (0.5 - m)(Vo - V\pi) \text{ for } 0 < m < 0.5$$

Where
Vo is the phase bias voltage
$V_\pi$ is the switching voltage
and m is the mark-to-space ratio.
Solving for m gives:

$$m = \frac{0.5\ V\pi - Vo}{2\ V\pi}$$

For a device with the transfer characteristic shown in FIG. 1c the mark-to-space ratio of the square-wave generator would be set to favour the negative electrode driver by the ratio 0.0833 to 0.9167. Of course it is not essential, merely preferable, that the clock generator provides a square-wave output, any suitable waveform or pulse shape can be used. Where a now-square-wave output is provided, thresholding means may be provided, and/or appropriate substitution be made for the D-type flip-flop 34.

Switch S1, which would probably not be provided in any real-life implementation of the circuit, illustrates the choice between the phase-bias arrangements of the embodiments shown in FIGS. 3 and 4. Hence, where the electrode drivers wave a DC offset capability the phase bias is applied to the 'live' electrode; alternatively where no DC offset capability exists the (negative) phase-bias is applied to the ground electrode.

While the invention has been described in terms of embodiments in which separate positive and negative electrode drivers are provided, this has been for ease of description. It is of course not essential to provide totally separate electrode drivers, although such an arrangement does offer advantages in certain circumstances, all that is necessary is that the electrode means can provide both positive and negative drive voltages.

I claim:

1. A method of minimizing voltage induced drift in electro-optic devices, the optical state of which is controllable by the application of an electrical potential between a first grounded electrode and a second electrode of the device, the method comprising controlling the electrical potentials applied between the first and second electrodes such that in use through the long term application of both positive voltages and negative voltages to said second electrode, the average potential difference between the first and second electrodes is substantially zero.

2. A method of controlling an electro-optic waveguide device, other than a liquid crystal device, the optical state of which is controllable by the application of an electrical potential between first and second electrodes of the device, the method comprising the steps of applying an electrical potential to either the first or second electrode, and holding the second or the first electrode at ground potential whereby the electrical potential is adjusted, with the potentials applied to said first or second electrode alternately being positive and negative as necessary, so that, in use, the average potential difference between the first and second electrodes tends to zero.

3. A driving arrangement for electro-optic devices, which arrangement comprises electrode driving means to supply both positive and negative drive voltages, averaging means to generate an average signal indicative of the average electrode voltage, and control means for controlling said electrode driving means in response to said average signal, which control means causes said electrode driving means to supply positive or negative drive voltages as necessary to maintain, in use, a substantially zero average electrode voltage.

4. A driving arrangement for electro-optic devices, which arrangement comprises a data input to receive an input data stream of known disparity, electrode driving means to supply both positive and negative drive voltages, and control means responsive to the input data stream for controlling said electrode driving means to supply positive or negative drive voltages as necessary to maintain, in use, a substantially zero average electrode voltage.

5. A driving arrangement as claimed in claim 4, wherein the control means is configured to ensure that, in the presence of an input data stream for the control of said electro-optic device, switching between positive and negative drive voltages occurs only during a logic-low state in the input data stream.

6. A driving arrangement as claimed in claim 5, wherein the control means comprises clock generation means to produce a stable control signal which determines the ratio of the incidence of positive drive voltages to the incidence of negative drive voltages, said ratio being a function of said known disparity.

7. A driving arrangement as claimed in claim 6 wherein the control means further comprises an edge triggered data latch, the data latch having a first input to receive said stable control signal, a second input to receive said data, the output of the data latch controlling the switching between the different polarity drive voltages, the arrangement being such that switching between electrode driver polarity occurs only during a logic-low state in the input data bit pattern, thereby ensuring synchronized transparent operation.

8. A driving arrangement as claimed in claim 3, wherein the electrode driving means comprises two electrode drivers, one for positive voltage pulses, and one for negative voltage pulses.

9. A driving arrangement as claims in claim 3 in operative association with an electro-optic device.

10. An electro-optic device when operated according to the method of claim 1.

11. A method of minimizing voltage induced drift in electro-optic devices having only two electrodes the optical state of which is controllable by the application of an electrical potential between a first electrode and a second electrode of the device, the method comprising controlling the electrical potentials applied to the first and second electrodes such that in use the average potential difference between the first and second electrodes is substantially zero.

12. A method of controlling an electro-optic waveguide device having only two electrodes, other than a liquid crystal device, the optical state of which is controllable by the application of an electrical potential between first and second electrodes of the device, the method comprising the steps of applying an electrical potential to either the first or second electrode whereby the electrical potential is adjusted, with the potentials applied to said first or second electrode alternately being positive and negative as necessary, so that, in use, the average potential difference between the first and second electrodes tends to zero.

13. A method as claimed in claim 11 wherein said first or said second electrode is held at ground potential.

* * * * *

UNITED STATES PATENT AND TRADEMARK OFFICE
CERTIFICATE OF CORRECTION

PATENT NO. : 5,218,468
DATED : June 8, 1993
INVENTOR(S) : Robert N. Shaw

It is certified that error appears in the above-identified patent and that said Letters Patent is hereby corrected as shown below:

On title page, item [73] Assignee, "British Telecommunications public limited company, London, England" should be deleted and -- BT&D Technologies Limited, Ipswich, Suffolk, England -- should be inserted.

Signed and Sealed this

Fifth Day of July, 1994

Attest:

BRUCE LEHMAN

Attesting Officer     Commissioner of Patents and Trademarks